United States Patent [19]

Burch

[11] Patent Number: 4,873,759

[45] Date of Patent: Oct. 17, 1989

[54] TIRE DEBEADING MACHINE

[75] Inventor: Elsward K. Burch, Northbrook, Ill.

[73] Assignee: Nu-Tech Systems, Inc., Rosemont, Ill.

[21] Appl. No.: 198,218

[22] Filed: May 25, 1988

[51] Int. Cl.[4] .............................................. B23P 19/00

[52] U.S. Cl. ..................................... 29/700; 29/426.4; 29/426.6; 29/566; 83/176; 83/454; 83/639.1; 83/923; 241/DIG. 31

[58] Field of Search ................. 83/923, 175, 176, 639; 29/426.4, 564.1, 564.7, 564.8, 802, 566, 700, 426.6; 225/93; 241/DIG. 31

[56] References Cited

U.S. PATENT DOCUMENTS

| | | | |
|---|---|---|---|
| 1,746,998 | 2/1930 | Gamel | 157/13 X |
| 2,230,302 | 2/1941 | Leguillon | 157/13 X |
| 2,298,685 | 10/1942 | Davis | 157/13 X |
| 3,650,012 | 3/1972 | Graveman | 29/403 |
| 3,701,296 | 10/1972 | Snow | 82/54 |
| 3,733,941 | 5/1973 | Geyer, Jr. | 157/13 X |
| 3,750,261 | 8/1973 | Iglehart et al. | 29/427 |
| 3,803,693 | 4/1974 | Kolkhir et al. | 29/200 D |
| 3,838,492 | 10/1974 | Uemura | 225/2 X |
| 4,090,670 | 5/1978 | Bennett | 241/23 |
| 4,134,316 | 1/1979 | Bullinger | 82/56 |
| 4,355,556 | 10/1982 | Ulsky | 83/54 X |
| 4,417,492 | 11/1983 | Winecoff | 82/46 |
| 4,422,581 | 12/1983 | Chryst | 83/923 X |
| 4,694,716 | 9/1987 | Sakamoto | 83/923 X |
| 4,738,172 | 4/1988 | Barclay | 83/175 X |
| 4,770,077 | 9/1988 | Garmater | 83/176 X |

*Primary Examiner*—Frank T. Yost
*Assistant Examiner*—Rinaldi Rada
*Attorney, Agent, or Firm*—Marshall, O'Toole, Gerstein, Murray & Bicknell

[57] ABSTRACT

Apparatus for quickly and effectively removing the bead wires from tires, and comprising first and second clamps which are movable toward and away from each other. A tire to be debeaded is positioned between the two clamps with the axis of the tire parallel with the direction of movement of the clamps. A harpoon is mounted for movement parallel to the axis of the tire and through openings of the clamps and the tire. The first and second clamps hold the tire between them, the clamps engaging the side walls of the tire. The harpoon is moved through the center opening of the tire, and barbs or hooks formed on the harpoon engage the beads and pull the bead wires out of the tire. The movement of the harpoon in one direction operates to center the tire, and movement in the opposite direction operates to remove the bead wires.

20 Claims, 8 Drawing Sheets

193
212
171
213
14
14
13
13
161
191
146
148
143
140
142
141
143
151
147
151
154
221
213
213
226

TIRE DEBEADING MACHINE

FIELD AND BACKGROUND OF THE INVENTION

This invention relates to apparatus for use in a system for reclaiming or recycling pneumatic tires such as automobile and truck tires.

Systems have been provided and are currently in use for recycling tires, and U.S. Pat. No. 4,090,670 to W. D. Bennett describes a system of this nature. Such systems usually include one or more shredders which cut the tires into small pieces, and a pyrolysis process which reduces the pieces to usable oil, carbon and a flammable gas.

While the shredders are effective in cutting up most of a tire including the belting, they have difficulty in cutting up the bead wires. These wires are located in the beads of the tire and are substantially heavier and more difficult to cut than the belting.

Machines have also been provided for debeading (removing the bead wires from) tires. In some machines, such as the machine shown in Ulsky U.S. Pat. No. 4,355,556, the entire bead including the bead wire is cut off from the side walls of a tire. The Leguillon U.S. Pat. No. 2,230.302 discloses a machine including blades for forming slits in the beads and a hook which pulls the bead wires out of the beads through the slits. Further, the Uemura U.S. Pat. No. 3,838,492 discloses a machine including a die having a narrow die opening, and a hook which pulls a bead wire through the die opening. The die operates to strip the elastomeric tire material from a bead wire as the wire is pulled through the die opening.

The machines shown in U.S. Pat. Nos. 2,230,302 and 4,355,556 are relatively complex and slow acting and do not easily accommodate tires of different diameters. The machine shown in U.S. Pat. No. 3,838,492 appears to place an excessive tension on a bead wire as it is pulled through the die opening. Apparently the bead wire may be broken in the latter machine, and this patent refers to a chuck for pulling an end of a bead wire through the die opening.

SUMMARY OF THE INVENTION

Improved apparatus in accordance with this invention operates to quickly and effectively remove the bead wires from tires, and comprises first and second clamp means which are movable toward and away from each other. A tire to be debeaded is positioned between the two clamp means with the axis of the tire parallel with the direction of movement of the clamp means. A harpoon is mounted for movement along the axis of the tire and through openings of the clamp means and the tire. The first and second clamp means hold the tire between them, the clamp means engaging the side walls of the tire. The harpoon is moved through the center opening of the tire, and barbs or hooks formed on the harpoon engage the beads and pull the bead wires out of the tire. The movement of the harpoon in one direction operates to center the tire, and movement in the opposite direction operates to remove the bead wires.

BRIEF DESCRIPTION OF THE DRAWINGS

The foregoing and other objects and advantages of the present invention will be apparent from the following detailed description taken in conjunction with the accompanying figures of the drawings, wherein.

DETAILED DESCRIPTION OF THE DRAWINGS

Figure 1:
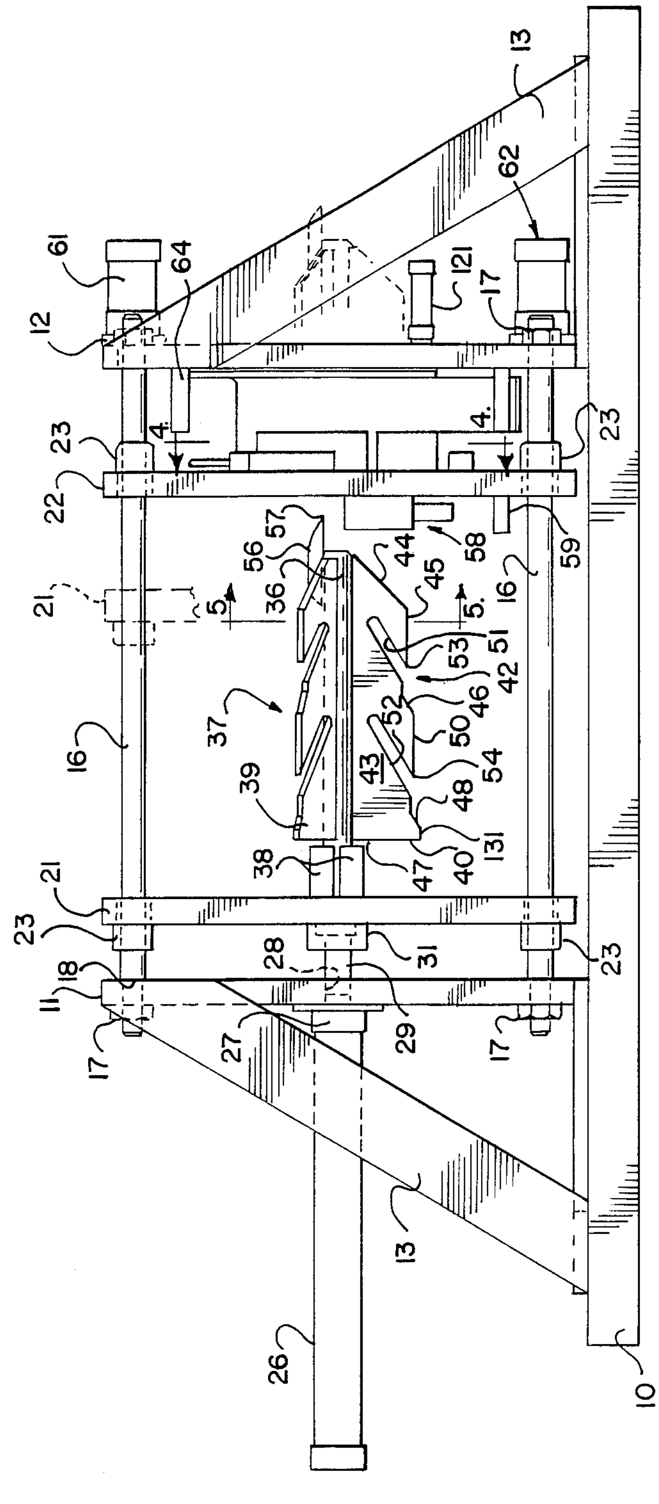
FIG. 1 is a side elevational view of a machine constructed in accordance with the invention.
Figure 2:
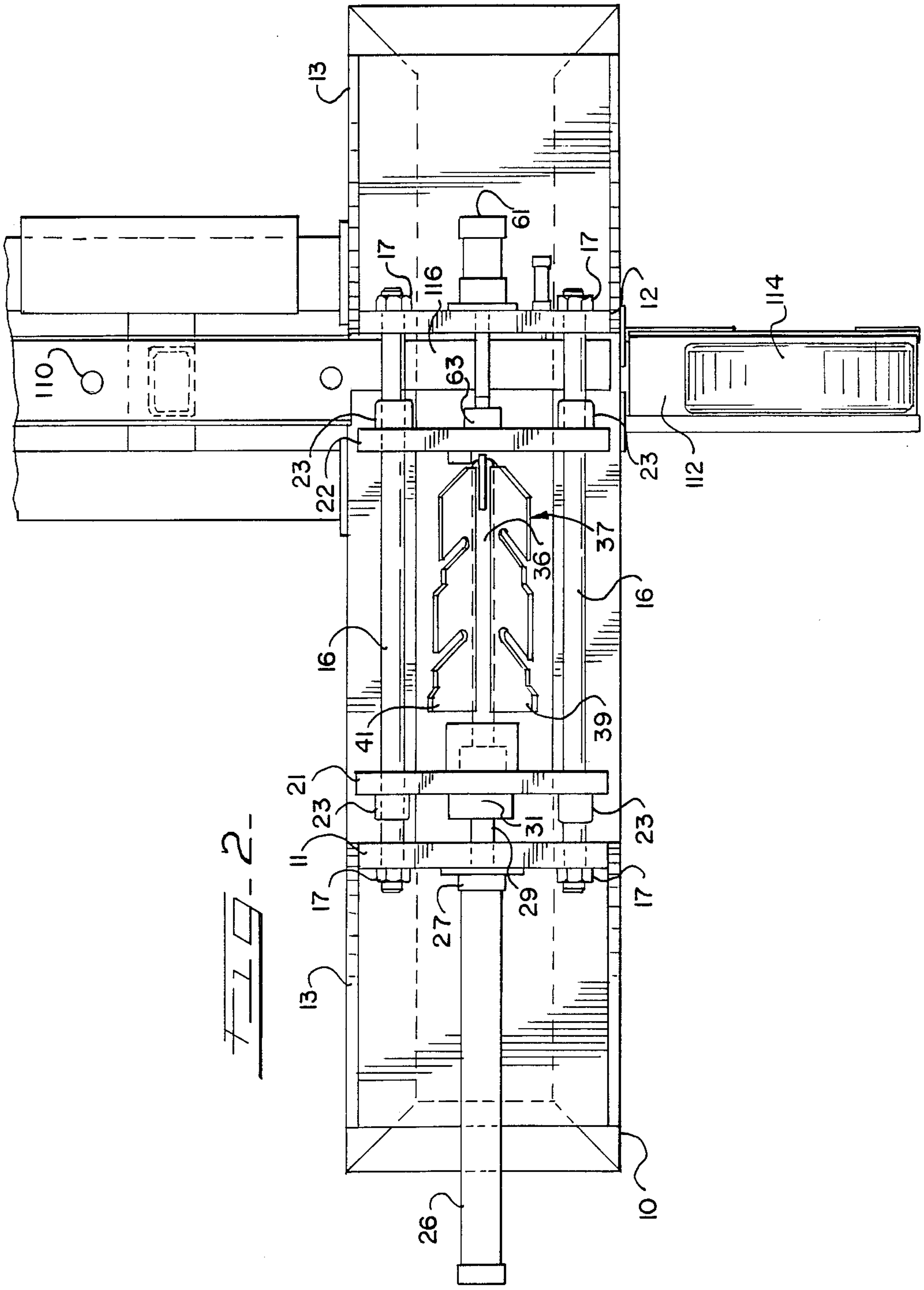
FIG. 2 is a top plan view of the machine shown in FIG. 1.

While the following detailed description includes references to locations or direction of movements of parts relative to other parts in the figures of the drawings, such as forward, rearward, horizontal, etc., it will be understood that these references are used only to facilitate the description of the parts during normal use and should not be considered as limiting the scope of the invention or to use of the machine to any particular orientation. The terms "front" and "advanced" mean toward the right as seen in FIGS. 1 and 2, and conversely "back" and "withdrawn" mean toward the left. Further, while the foregoing description relates to a preferred embodiment and to an alternative embodiment of the invention, it should be understood that further variations may be made in the design of the apparatus without departing from the scope of this invention.

Figure 3:
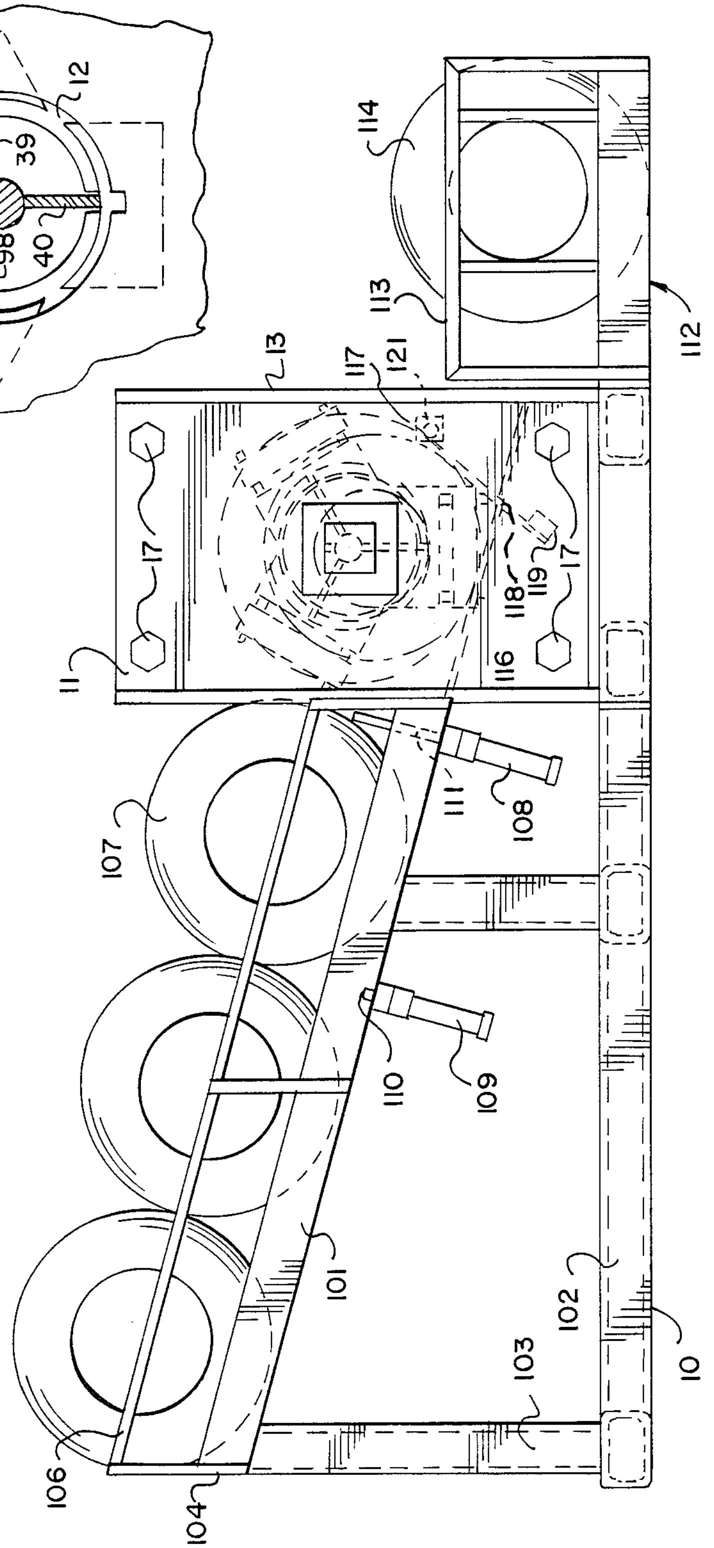
FIG. 3 is a view taken from one end of the machine.

With specific reference initially to FIGS. 1, 2 and 3 of the drawings, the machine comprises a frame formed by a horizontal base 10 that is generally rectangular when viewed from above as seen in FIG. 2. Secured to the base and extending vertically upwardly from it (perpendicular to base 10) are a stationary rear plate 11 and a stationary clamping or front plate 12. The two rectangular plates 11 and 12 are spaced from the ends of the base 10 as shown in FIG. 1 and they are secured against movement by diagonal braces 13. Extending between the plates 11 and 12 are four guide bars 16 which extend horizontally and parallel to each other, and which are located at the four corners of the plates 11 and 12. The ends of the four guide bars 16 are threaded and the threaded ends extend through holes in the two plates, and nuts 17 are provided for securing the guide bars 16 tightly to the plates 11 and 12. On the sides of the plates 11 and 12 opposite from the nuts 17 are formed abutments 18 on the guide bars, whereby the plates are clamped tightly between the abutments 18 and the nuts 17.

Movably mounted on the frame of the machine between the two plates 11 and 12 are a harpoon carrier plate 21 and a movable clamp plate 22. The two plates 21 and 22 are also rectangular and have slightly smaller dimensions than the outer plates 11 and 12 as illustrated in FIGS. 1 and 2. Holes are formed through the corners of the two plates 21 and 22 and slide bearings 23 are fastened around the holes. The slide bearings 23 are slidably mounted on the four guide rods 16, whereby the two plates 21 and 22 may be moved along a horizontal line of movement (parallel to the base 10 and the guide bars 16) between the two plates 11 and 12. As illustrated, the two plates 21 and 22 also extend generally vertically and are parallel to the two plates 11 and 12.

Mounted on the backside of the rear plate 11, and at substantially its center, is a hydraulic cylinder 26. One end of the cylinder 26 is rigidly secured to the plate 11 and its piston rod 29 is movable along a horizontal axis which extends substantially through the centers of the four plates 11, 12, 21 and 22. A mounting bracket 27 is provided to attach the end of the cylinder 26 to the plate 11. An opening 28 is formed substantially centrally of the plate 11 and the piston rod 29 extends through the opening 28. The forward end of the piston rod 29 is secured to a mounting bracket 31 which serves to secure the end of the rod 29 to the harpoon carrier plate 21. A conventional hydraulic drive (not shown) is connected to both ends of the hydraulic cylinder 26 whereby hydraulic pressure may be applied to one side or the other of the piston in order to force the piston rod 29 either in the advanced direction or in the withdrawn direction. Thus, by operating the hydraulic cylinder 26, the rod 29 and the plate 21 are movable between the withdrawn position illustrated in full lines in FIGS. 1 and 2 and an advanced position illustrated partially in dashed lines in FIG. 1. As will be described in more detail hereinafter, the plate 21 has one advanced position for a relatively large diameter tire and another advanced position for a smaller sized diameter tire.

Figure 5:
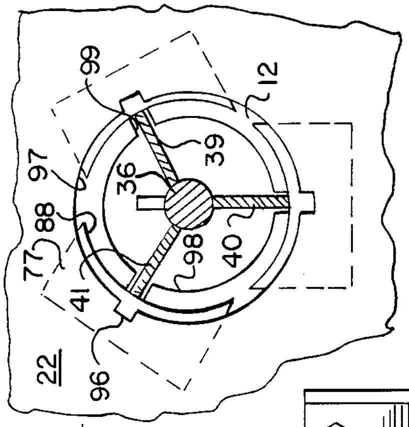
FIG. 5 is a fragmentary view taken on the line 5—5 of FIG. 1.
Figure 4:
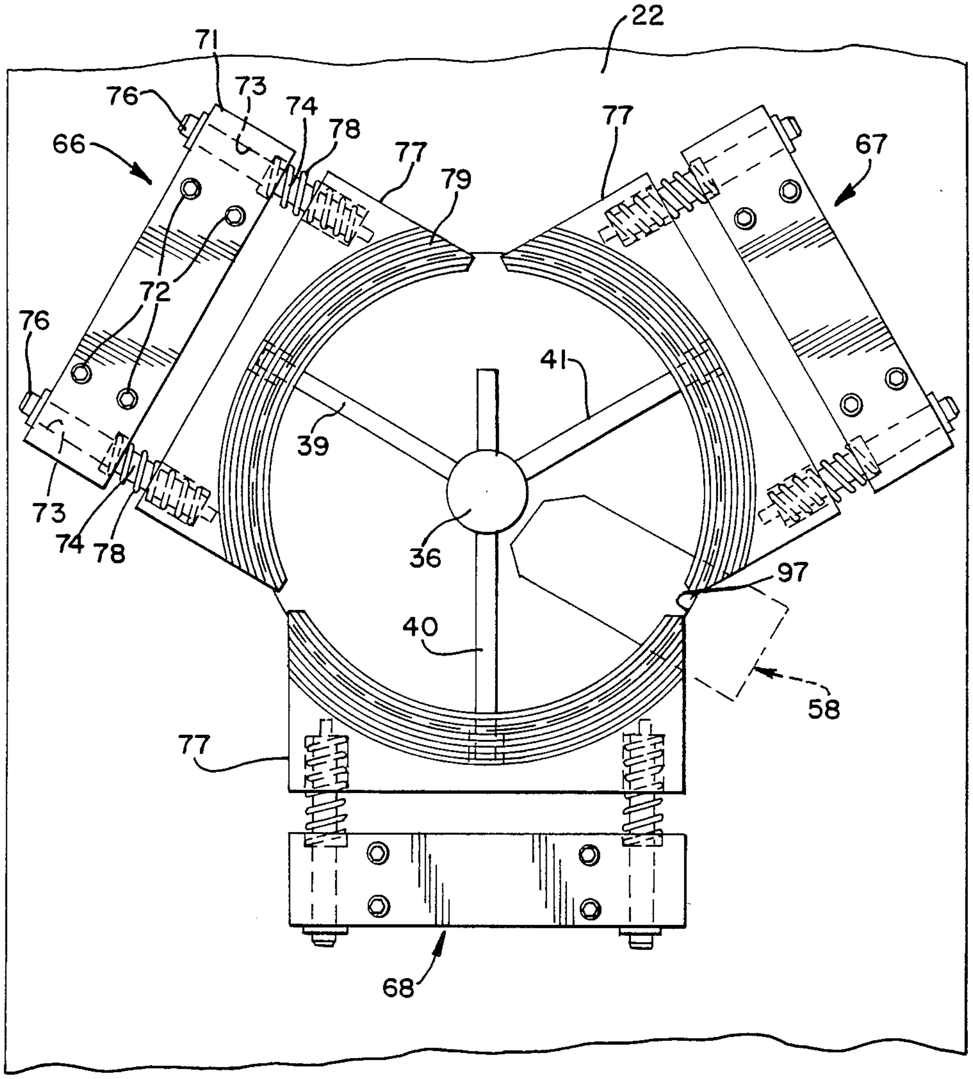
FIG. 4 is an enlarged fragmentary view taken on the line 4—4of FIG. 1.

The rod 29 and the mounting bracket 31 are on the back side of the plate 21 as previously mentioned, and, on the front side and substantially in line with the piston rod 29 is mounted the shaft 36 of a harpoon 37. The harpoon shaft 36 is secured to the forward side of the carrier plate 21 by clamps 38 and the shaft 36 extends toward the two plates 12 and 22. Secured to the harpoon shaft 36 are a plurality of radially extending harpoon blades, and in the present specific example, three blades 39, 40 and 41 are provided. The harpoon shaft 36 and the three blades 39–41 are also shown in FIGS. 4 and 5, which illustrate that the three blades are located at equal angular distances of 120°.

In the present specific example, the three harpoon blades 39–41 are formed from steel plate material and have identical profiles. As a consequence, only the profile of the downwardly extending blade 40 will be described herein in detail. With reference to FIG. 1, the blade 40 is divided (in the lengthwise direction) into a small width portion 42 which is adjacent the forward end of the blade, and a larger width portion 43 which is at the rearward end of the blade. The forward edge 44 of the blade slants rearwardly and radially outwardly from the forward end of the shaft 36 to the outer edge 45 of the portion 42 and then the outer edge 45 of the blade extends horizontally rearwardly from the forward edge 44. At the juncture of the two portions 42 and 44, an intermediate slanted edge 46 is formed on the outer edge of the blade, and adjacent the rearward end 47 of the blade is formed another rearward slanting edge 48, a large width edge 50 being provided between the slanted edges 46 and 48. Formed in the small width portion 42 of the blade is an angled slot 51 which angles from the outer edge 45 radially inwardly and in the forward direction. A similar slot 52 is formed in the large width portion 43 of the blade. Where the forward edges of the slots 51 and 52 meet the outer edges 45 and 50, hooks or barbs 53 and 54 are formed on each blade. The slots 51 and 52 form an acute angle of approximately 30° in the present specific example. Thus, the slots 51 and 52 of the three blades form a barbed configuration of the harpoon.

In addition to the three blades 39–41, a centering beak is preferably mounted adjacent the forward end of the harpoon shaft 36. The centering beak 56 is preferably mounted on the upper side of the shaft 36 between the two upwardly angled blades 39 and 41, and it includes a tapered forward end 57. During the operation of the machine, the centering beak 56 passes into the center opening of a tire and engages the inner bead of the tire to be debeaded, and helps to center the tire around the harpoon.

Fastened to the rearward side of the movable clamp plate 22 is a shearing mechanism 58 for cutting the bead wires after they have been removed from the tire. The mechanism 58 is angularly displaced from the beak 56 and is located between two of the harpoon blades. Also fastened to the rearward side of the clamp plate 22 is a stop 59 which extends rearwardly farther than the shear mechanism 58 and prevents the plate 21 from being moved so close to the plate 22 that the mechanism 58 might be damaged. The stop 59 therefore forms a minimum distance or space between the two plates 21 and 22.

The movable clamp plate 22 is mounted relatively close to the stationary clamp plate 12 and the plate 22 is normally in a withdrawn position, shown in solid lines in FIG. 1, where it is spaced from the plate 12 by a distance which is slightly greater than the width of a typical automotive-type tire. To move the plate 22, a plurality of hydraulic cylinders 61 and 62 are mounted on the stationary clamp plate 12 and connected to the movable clamp plate 22. Each of the cylinders 61 is mounted on the forward side of the plate 12, and the piston rods of the cylinders extend rearwardly through holes formed in the plate 12 and are connected by brackets 63 (see FIG. 2) to the forward side of the movable clamp plate 22. The hydraulic cylinders 61 and 62 are also connected to a hydraulic power supply and are operable to move the plate 22 either forwardly toward the plate 12 or rearwardly away from the plate 12. A stop 64 may be mounted on the stationary clamp plate 12 and extends rearwardly toward the plate 22, and forms a minimum distance or limit between the plates 12 and 22 when the plate 22 is moved forwardly.

Figure 6:
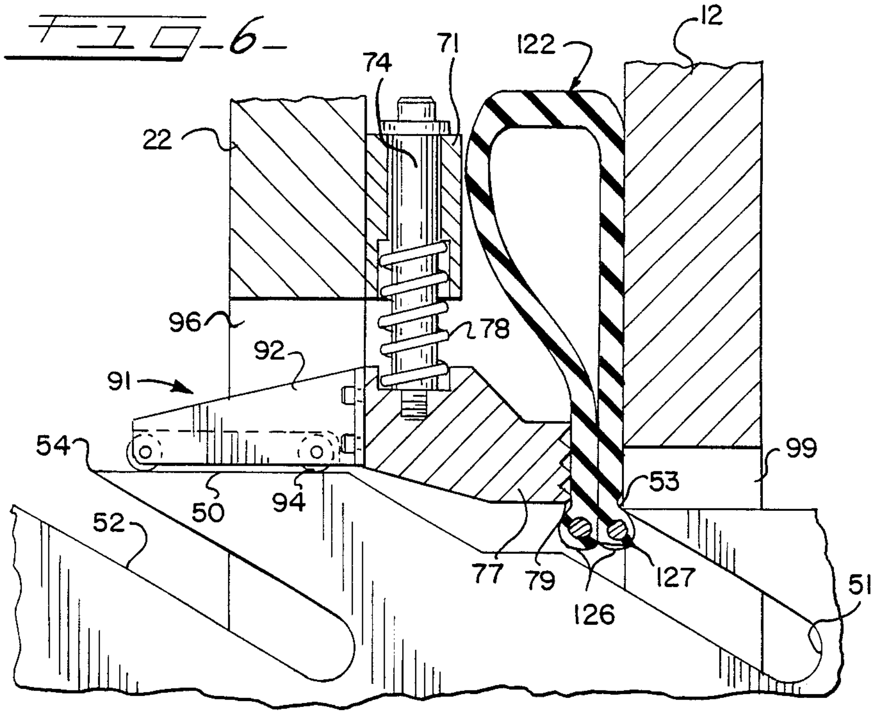
FIG. 6 is an enlarged fragmentary sectional view illustrating the operation of the machine.
Figure 7:
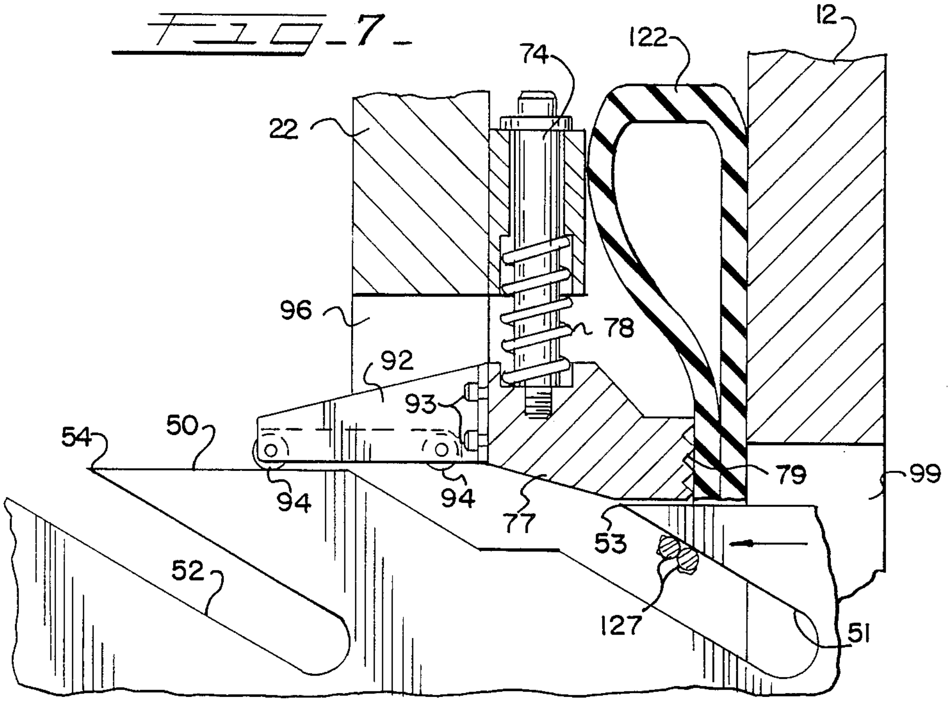
FIG. 7 is a view similar to FIG. 6 but illustrating another step in the operation of the machine.

The movable clamp plate 22 supports three angularly spaced clamp mechanisms 66, 67 and 68, best illustrated in FIGS. 4, 6 and 7. The three clamp mechanisms are identical and therefore only the mechanism 66 will be described in detail.

The clamp mechanism 66 comprises a mounting bar 71 which is secured to the forward side of the movable clamp plate 22 by a plurality of screws 72. Formed through the bar 71 are two holes 73 which are parallel to a radial line passing through the axis of the harpoon shaft 36. Elongated pins 74 are movably mounted in the openings 73, and caps 76 are secured to the radially outer ends of the pins and limit the extent to which the pins 74 may move radially inwardly relative to the bar 71.

Secured to the radially inner ends of the two pins 74 is a movable clamp bar 77, and compression springs 78 are mounted around the two pins 74 and between the two bars 71 and 77, the compression springs 78 operating to urge the movable bar 77 radially inwardly. As best shown in FIGS. 6 and 7, the forward side of the bar 77 extends forwardly toward the stationary clamp plate 12 and a plurality of arcuate teeth 79 are formed on the forward side of the bar 77. Further, the radially inner side 88 of the bar 77 is curved on substantially the same center as the curved teeth 79. Thus, as shown in FIG. 4, the teeth 79 and the inner side 88 of the movable clamp bars 77 of the three clamping mechanisms form discontinuous circles having their centers on the axis of the harpoon shaft 36. When the movable bars 77 are in their normal positions where they are in their maximum radially inwardly displaced positions, the teeth 79 form a circle having generally the same diameter as that of the side wall of a smaller size automotive tire of the type used with compact automobiles.

With specific reference to FIGS. 6 and 7, mounted on the rearward side of each of the movable clamp plates 77 is a lifter mechanism 91 formed by a bracket 92 which is secured to the rearward side of the movable bar 77 by screws 93. Rotatably mounted adjacent the radially inner edge of the bracket 92 are two rollers 94 which are spaced in the forward-rearward direction (parallel to the axis of the harpoon shaft 36). The lifter mechanisms 91 extend through radially extending slots formed in the movable clamp plate 22, the slots being indicated by the reference numeral 96 in FIGS. 6 and 7.

With reference to FIG. 5, the slots 96 formed in the clamping plate 22 are illustrated, and it will be noted that the innermost surfaces 88 of the movable clamp plates 77 extend radially inwardly slightly from the periphery of the opening 97 of the movable clamp plate 77. An opening 98 is also formed in the stationary clamp plate 12 on the axis of the harpoon shaft 36, and as shown in FIG. 5 the opening 98 is circular and has a slightly smaller diameter than the diametral distance between the inner surfaces 88 of the movable clamp bar 77. Slots 99 are also formed in the stationary clamp plate 12 in alignment with the slots 96 of the movable clamp plate 22, and the slots 99 and 96 are aligned with the three blades 39–41 of the harpoon, whereby the outer ends of the three blades may move through the slots 96 and 99 when the harpoon is advanced through the openings 97 and 98 of the two plates 12 and 22 during a debeading operation, as will be described hereinafter.

Tires to be debeaded may be manually positioned between the plates 12 and 22 and later removed from between the plates, or chutes may be provided for this purpose. A suitable chute is illustrated in FIGS. 2 and 3 and comprises an inclined feed chute 101 which is supported by a base frame 102 and supports 103. The feed chute 101 has an entrance end 104 which is elevated above the level of the openings 97 and 98 of the plates 12 and 22, and it slants downwardly and toward the openings 97 and 98. Guide rails 106 are provided on the opposite sides of the chute 101, and tires to be debeaded are placed on end one behind the other on the chute 101 as shown in FIG. 3. To restrain the tires 107 on the chute during a debeading operation, hydraulic stops 108 and 109 are provided, the stop 108 being located adjacent the plates 12 and 22 and the stop 109 being located upstream a distance of approximately the diameter of one tire. The rod 111 of the stop 108 normally extends upwardly into the path of the lead tire 107 and prevents it from rolling down the chute. The other stop 109 may be normally retracted as shown in FIG. 3 and is extended to hold the second tire in line back while the lead tire is moving into the machine. After the lead tire has been allowed to roll into the machine while the rod 111 is retracted, the rod of the stop 109 is retracted while the rod of the stop 108 is again extended and the tires are allowed to advance.

On the opposite side of the machine is provided a discharge chute 112 which again has guide rails 113 at the sides for holding a tire 114 upright. Between the two plates 12 and 22 is mounted a relatively narrow extension of the chute 101, this extension being indicated by the numeral 116. Between the extension 116 and the discharge chute 112 is mounted a pivotable gate chute 117 which is pivotably mounted on a pivot shaft 118. One side of the gate chute 117 extends upwardly and toward the right from the pivot shaft 118 and is in the path of a tire rolling on the extension 116 between the two plates 12 and 22. Extending in the opposite direction is a counterbalance weight 119 which is heavier than the gate chute 117 and normally urges the gate chute 117 in the counterclockwise direction as seen in FIG. 3 to the position illustrated. A release mechanism 121 (also shown in FIG. 1) is mounted on the stationary clamp plate 12 on the opposite side of the gate chute 117. An opening is formed in the clamp plate 12 and the rod of the mechanism 121 extends through this opening. When the gate chute 117 is pivoted upwardly to the position shown, the rod of the mechanism 121 is extended and is located underneath the gate chute 117 and thereby prevents the gate chute 117 from pivoting in the clockwise direction as seen in FIG. 3. Consequently, even if a tire is located between the two plates 12 and 22 and rests against the extension 116 and the gate chute 117, the release mechanism 121 prevents the gate chute 117 from being pivoted clockwise due to the weight of the tire. However, after the tire has been debeaded, the mechanism 121 is operated to retract the piston rod, and at this time the weight of the tire overcomes the force of the counterbalance 119, causing the gate chute 117 to pivot clockwise and become substantially aligned with the feed chute 101 and the discharge chute 112. The tire then rolls down the gate chute 117 and into the discharge chute 112 where they may be manually removed. After the tire has rolled off of the gate chute 117, the counterbalance 119 causes it to pivot back in the counterclockwise direction to the upward position and the release mechanism 121 is again operated to extend the piston rod and hold the gate chute 117 in this position.

Considering now the overall operation of the machine, assume that a number of relatively small diameter tires are to be debeaded. The tires are loaded onto the feed chute 101 as shown in FIG. 3. The hydraulic cylinder 26 is operated to move the harpoon 37 to its withdrawn position as illustrated in FIGS. 1 and 2, and the hydraulic mechanisms 61 and 62 are operated to move the movable clamp plate 22 to its rearwardly displaced position where it is spaced from the stationary clamp plate 12. The gate chute 117 is pivoted by the counterweight 119 to the upward or stop position and the release mechanism 121 is operated to place the piston rod underneath the gate chute and thereby hold the gate chute in the upward position. The hydraulic mechanism 108 is operated to withdraw the piston 111 and the hydraulic mechanism 109 is operated to extend its piston rod 110. As a consequence the lead tire on the feed chute 101 rolls down the feed chute 101 and into the space between the two plates 12 and 22 and comes to rest on the extension 116 and the gate chute 117, as indicated by the dashed lines in FIG. 3. The piston rod 111 is then extended once again and the rod 110 is withdrawn, and the remaining tires on the feed chute 101 advance one position.

With the tire located between the two plates 12 and 22, the hydraulic cylinder 26 is then operated to advance the harpoon 37 toward the right as seen in FIGS. 1 and 2. The centering beak 56 on the lead or forward end of the harpoon moves into the center opening of the tire, and the slant on the upper side of the centering beak 56 moves the tire upwardly slightly and generally centers the tire on the harpoon. Continued advancement of the harpoon causes the forward edges 44 of the three harpoon blades to engage the beads of the tire and complete the centering of the tire.

As soon as the tire has been centered, the hydraulic cylinders 61 and 62 are operated to move the movable clamp plate 22 toward the right as seen in FIGS. 1 and 2, and the plate 22 moves forwardly with the harpoon. With reference to FIGS. 6 and 7, the movable clamp bars 77 of the three clamp mechanisms 66 through 68 engage the rearward side wall of the tire, and the teeth 79 press the forward side wall tightly against the stationary clamp plate 12. Since, as shown in FIG. 5, the diameter of the opening 98 of the stationary plate is less than the diametral distance between the teeth 79, the portions of the side walls between the slots 99 are tightly clamped between the stationary clamp plate 12 and the teeth 79.

With reference to FIG. 5, before or during the time that the side walls are clamped and held in place as described above, the harpoon is moved partially through the center opening of the tire, and the inner surfaces of the beads 126 first ride along the smaller width edges 45 of the harpoon blades and move past the points or hooks 53. The radial widths of the edges 45 of the three blades is sized such that the points 53 are spaced radially outwardly slightly from the beads 126 and are slightly outwardly displaced from the bead wires 127 of the tire 122. As soon as the beads 126 slide past the points 53, the beads contract radially inwardly slightly so that the points 53 are radially outside of the bead wires 127. The advance movement of the harpoon is then stopped. As shown in FIGS. 6 and 7, the rollers 94 roll along the outer edges of the larger width edges 50 of the harpoon blades during the foregoing movement of the harpoon.

After the forward part of the harpoon has been moved into the tire as described above, and with the tire tightly clamped between the stationary plate 12 and the movable clamp bars 77, the hydraulic mechanism 26 is operated to move the harpoon toward the left to the withdrawn position. The points 53 of the harpoon then engage the beads, and the points 53 pierce the tire just outwardly of the bead wires. As the harpoon is withdrawn, the bead wires 127 are hooked and pulled radially inwardly and toward the left as shown in FIG. 7. The slanted edges 131 of the slots 51 pull the bead wires 127 radially inwardly as well as toward the left, and since the beads 126 are weakest at their radially inner surfaces, the harpoon blades cause the beads to tear and they pull the bead wires 127 inwardly out of the beads. The bead wires are thus torn out of the beads while the tire remains clamped between the plates. The harpoon may thus be completely removed to the withdrawn position and the bead wires will be located in the slots 51 of the harpoon blades, and then the hydraulic mechanisms 61 and 62 are operated to move the movable clamp plate 22 away from the stationary clamp plate 12 and thus release the debeaded tire. The release mechanism 121 is then operated to withdraw the piston rod and allow the gate chute 117 to pivot clockwise as seen in FIG. 3 due to the weight of the debeaded tire on it, and the debeaded tire then rolls downwardly to the position indicated by the numeral 114. The bead wires removed from the tires are then cut and removed from the harpoon and the process may be repeated.

As previously mentioned, the optional mechanism 58 may be provided for automatically removing the bead wires from the harpoon as the harpoon is withdrawn. The mechanism 58 shown in FIGS. 1 and 4 may be provided to hook onto the bead wires in the slots 51 during withdrawal of the harpoon and cut through the wires, thereby allowing the bead wires to drop off.

In the event a larger diameter tire is to be debeaded, the operation is generally similar except that the harpoon is further advanced into the openings of the plates 12 and 14. With reference to FIGS. 1 and 2, the larger tire is again centered as the harpoon is moved through the openings of the plates 12 and 14 and the movement of the harpoon is continued until the beads of the tire slide along the large width edges 50 of the harpoon blades and move past the hooks 54. When the harpoon moves this far, the rollers 94 of the clamp mechanisms ride upwardly on the sloped portions 48 of the blades and onto the radially outermost edges 131 of the blades. This action causes the movable clamp bars 77 to be shifted radially outwardly from the normal position and thereby increase the diametral distance between the movable clamp bars. With this increased diametral distance, the clamp bars are again in position to properly engage the side walls outwardly of the beads and to clamp the tire against the stationary clamp plate 12. Thus, the clamp mechanisms are automatically adjusted to accommodate the larger diameter tires. The remainder of the operation is essentially as previously described.

FIGS. 8 through 14 illustrate an alternative and preferred embodiment of the invention. This embodiment includes a frame which is constructed similarly to the frame shown in FIGS. 1 to 7. The parts of the machine shown in FIGS. 8 through 14 which are essentially identical with corresponding parts of the machine shown in FIGS. 1 through 7 are given reference numerals which are 200 plus the number given to the parts shown in FIGS. 1 through 7. Since the construction and functioning of these parts are essentially the same as those of the corresponding parts of FIGS. 1 through 7, they will not be described in detail once again.

Figure 8:
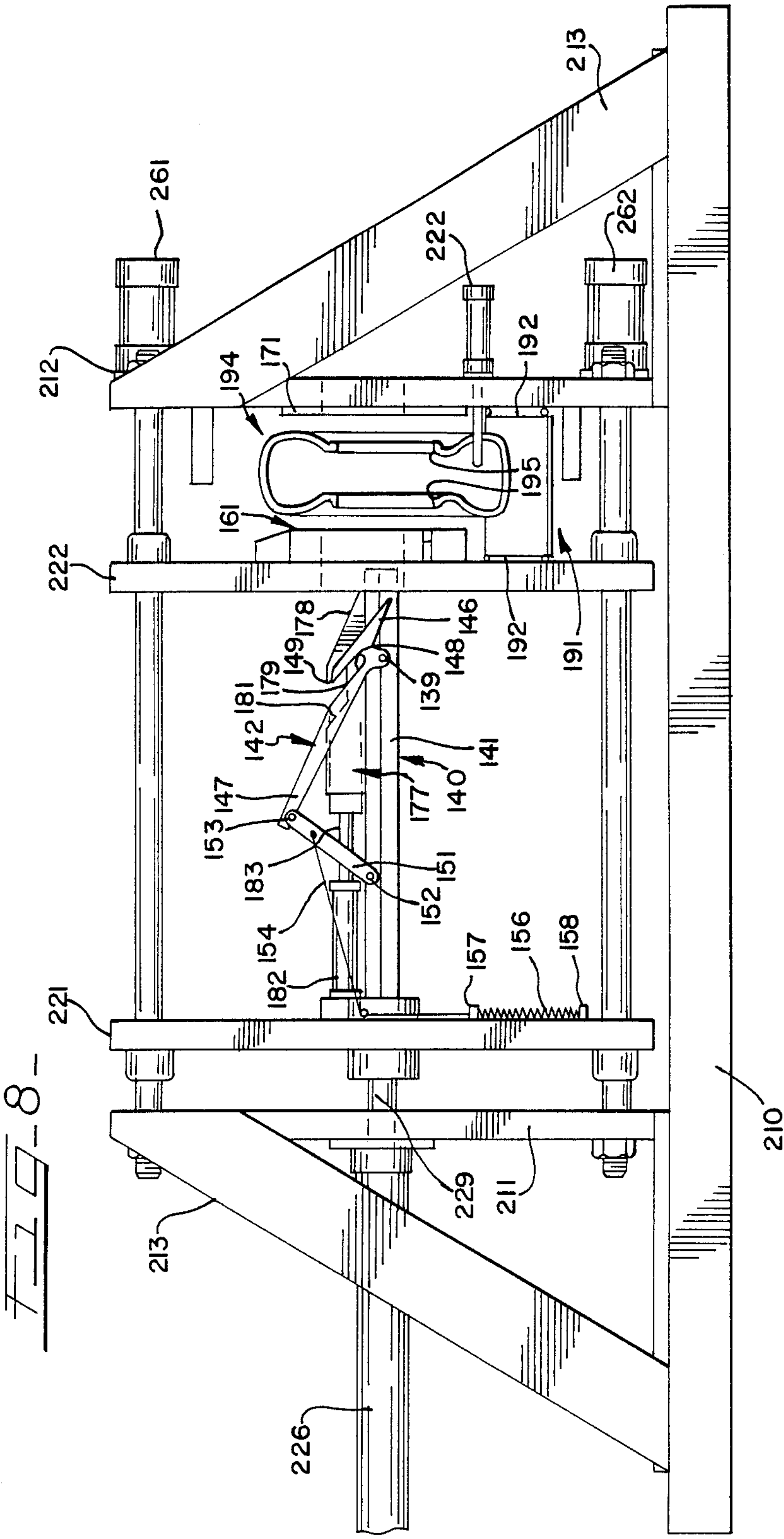
FIG. 8 is a view similar to FIG. 1 but illustrating a preferred embodiment of the invention.
Figure 9:
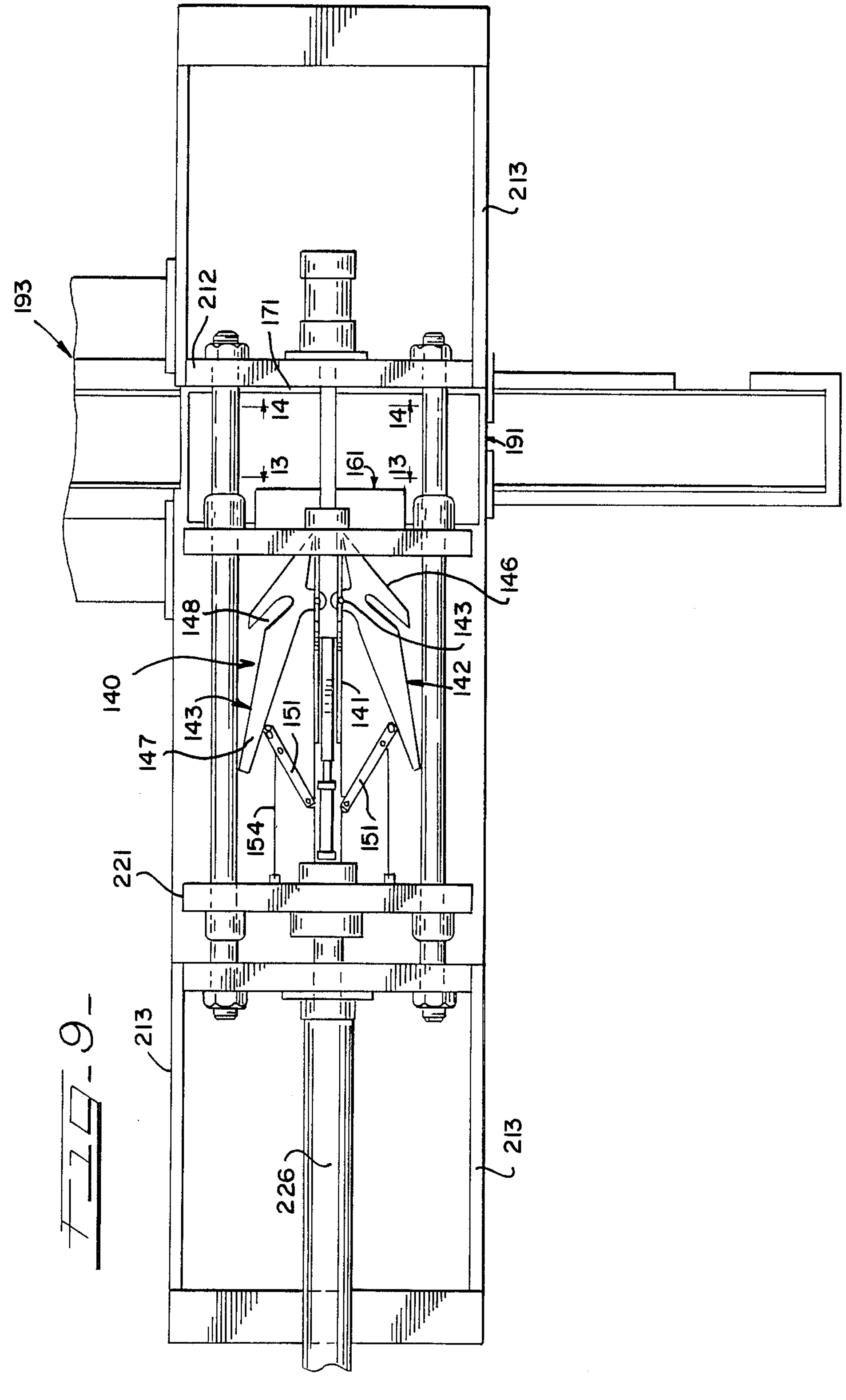
FIG. 9 is a top plan view of the embodiment of FIG. 8.

With specific reference to FIGS. 8 to 13, the harpoon 140 includes a shaft 141 which is mounted on the harpoon carrier plate 221. The harpoon 140 further includes two harpoon blades 142 and 143 which are best illustrated in FIG. 9, and the blades 142 and 143 are pivotably mounted on the shaft 141 by pins 139. Each of the two blades 142 and 143 includes a forward tire centering portion 146, a rearward lever portion 147, and a slot 148 which is located generally between the two portions 146 and 147. The pivot pin 139 of each blade is located generally underneath the slot 148. A sharp hook or barb 149 is formed on each blade where the slot 148 meets the rearward end of the forward portion 146.

Figure 10:
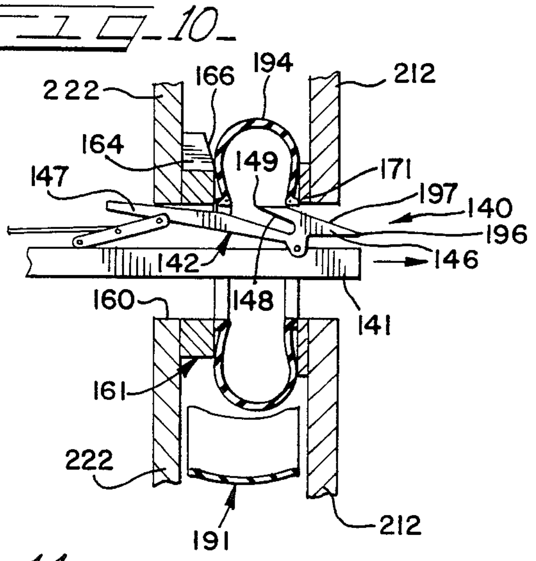
FIGS. 10 to 12 illustrate steps in the operation of the embodiment of FIG. 8.

For each of the two harpoon blades there is also provided a mechanism for biasing the blade to the position illustrated in FIGS. 8 and 9 wherein the forward portion 146 is tipped radially inwardly and the rearward end of the lever portion 147 extends radially outwardly. This mechanism comprises, for each blade, an arm 151 which has its rearward end pivoted by a pin 152 on the harpoon shaft 141. From the pin 152, each arm 151 extends forwardly and radially outwardly, and its forward end 153 engages the radially inner side of the lever portion 147 of the associated harpoon blade. Consequently, pivotal movement of the arm 151 in the counterclockwise direction as seen in FIGS. 8, 9 and 10 causes the lever portion 147 to be pivoted upwardly and the harpoon blade to swing in the clockwise direction as seen in these figures to the position shown in FIG. 8. Of course, pivotal movement of the arm 151 in the opposite direction enables the harpoon blade to swing in the counterclockwise direction. Each arm 151 is connected by a flexible cable 154 to a spring mechanism which biases the arm 151 in the counterclockwise direction as seen in FIG. 8. The spring mechanism comprises a compression spring 156 which has its upper end fastened by a fixed block 157 to the plate 221. The spring 156 in this instance is a coiled compression spring, and the cable 154 extends through the center of the coiled spring 156 and is attached to a movable block 158 which is fastened to the lower end of the spring 156. The natural tendency of the spring 156 to press downwardly causes the cable 154 to be pulled rearwardly and downwardly and the arm 151 to be pivoted in the counterclockwise direction as seen in FIG. 8 as previously explained. The cable 154 is attached to the arm 151 between the pin 152 and the other end 153. The pivot pins 152 and 139 are mounted on the harpoon shaft 141 such that the blades 142 and 143 and the arms 151 associated with them pivot in radial planes with respect to the axis of the harpoon shaft 141.

Figure 11:
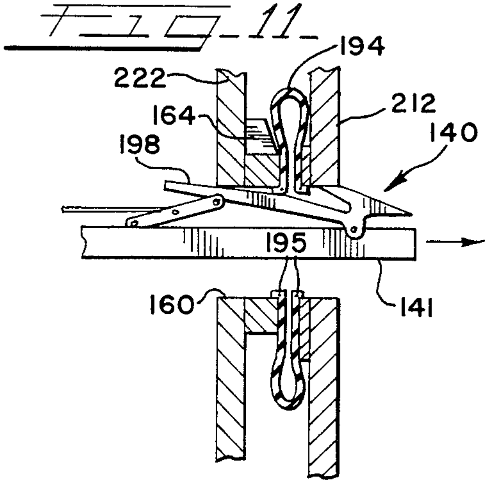
Figure 12:
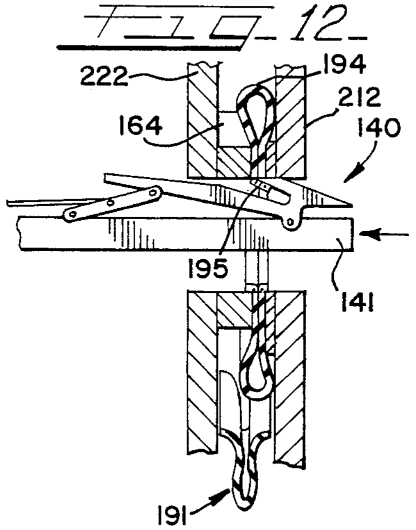
Figure 13:
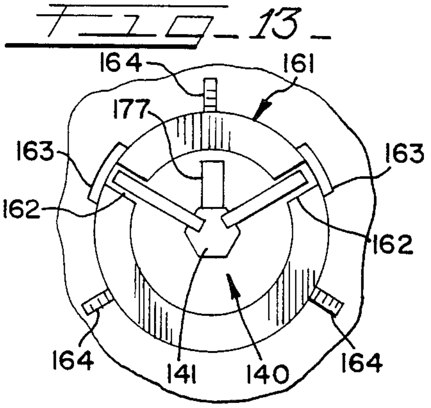
FIGS. 13 and 14 are sectional views taken on the lines 13—13 and 14—14 of FIG. 9.

Instead of adjustable tire clamps as illustrated in FIGS. 1 through 7, the machine shown in FIGS. 8 through 14 includes a fixed clamp ring 161 on the plate 222 which is also shown in FIG. 13. A circular hole 160 (FIG. 10) is formed in the plate 222 and the harpoon is located to extend through this hole, and the clamp ring 161 extends around the hole 160. The clamp ring 161 is an essentially solid member except for two slots 162 which extend radially (relative to the harpoon shaft 141) through it, and the slots 162 are located to enable the blades 142 and 143 to pass through. The ring 161 is secured (as by welding) to the clamp plate 222, and in addition arcuate supports 163 are fastened to the radially outer surface of the ring 161 and overlie the slots 162 in order to strengthen the ring in these areas. In addition, three (in the present specific example) gussetts 164 are secured between the outer surface of the ring 161 and the plate 222. Each of the gussetts has a slanted forward surface 166. The three gussetts 164 function to support the clamp ring 161 on the plate 222 and they further serve the function of preventing a tire from sliding out and around the outer surface of the clamp ring during a debeading operation, as will be described hereinafter.

Figure 14:
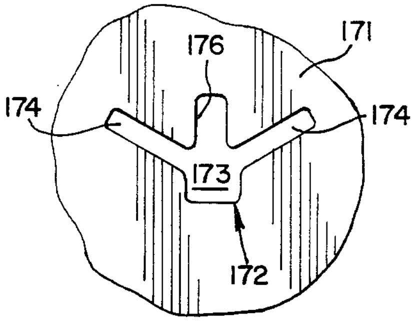

Fastened to the stationary plate 212 opposite the clamp ring 161 is a circular clamp plate 171 which is also illustrated in FIG. 14. The plate 171 has a substantially smaller thickness than the ring 161, and it has an opening 172 formed therein as shown in FIG. 14. The opening includes a center portion 173 which is located to receive the harpoon shaft 141, and two upwardly and radially outwardly angled slots 174 which are located to receive the two harpoon blades 142 and 143. The opening 172 also includes an upwardly extending portion 176 which is located to receive a bead cutter mechanism 177 which will be described shortly.

The cutter mechanism 177 includes a tire centering forward portion 178 (FIG. 8) which has a forward surface that slants rearwardly and radially outwardly from adjacent the forward end of the harpoon shaft 141. At approximately the location of the slots 148 of the harpoon blades is located an opening 179 (see FIG. 8) of the cutter mechanism 177, and rearwardly of the opening 179 is mounted a cutter blade 181. The housing of the cutter mechanism 177 is secured to the upper side of the harpoon shaft and the cutter blade 181 is movable on the housing in the axial direction into and out of the slot 179. A hydraulic mechanism 182 has its piston shaft 183 fastened to the blade 181 in order to move the cutter blade through the slot or opening 179 and slice or cut tire beads located in the slot as will be described.

The embodiment of FIGS. 8 through 14 further includes a foldable support 191 for supporting a tire between the two plates 212 and 222 prior to the time that the tire is clamped between the plates and again after the beads have been removed. The foldable support 191 may be formed by a sheet of flexible tough material such as a piece of canvas or belting which extends across the space between the plates 212 and 222 and below the clamp ring 161 and the clamp plate 171 (see FIGS. 8 and 9). The two laterally extending edges 192 of the support 191 are secured to the plates 212 and 222 and the size of the support 191 is such that it is pulled relatively taut when the plate 222 is moved rearwardly away from the plate 212 during the operation of the machine, as shown in FIG. 8. In the taut position of the support 191, a tire is rolled from the supply chute 193 (see FIG. 9) and into the space between the two plates 212 and 222, and it comes to rest on the taut support 191. When the plate 222 is moved toward the right in the direction of the plate 212, the tire is supported by the harpoon and it moves off of the support 191 as shown in FIG. 10. During the time that the harpoon is moved through the tire, the support 191 is simply allowed to fold downwardly as illustrated in FIG. 12. It will be apparent therefore that the support 191 automatically folds out of the way as the tire is being clamped but is stretched taut in order to support a tire when needed. The support 191 is further advantageous in that it may be formed of a relatively inexpensive piece of material.

Considering now the operation of the machine shown in FIGS. 8 through 14, assume that the plate 222 and the plate 221 are initially in the positions shown in FIGS. 8 and 9. A tire 194 having two annular beads 195 is rolled from the chute 193 into the space between the two plates 212 and 222 and comes to rest on the support 192. The two springs 156 pivot the arms 151 counterclockwise and tip the two harpoon blades so that their forward ends are turned radially inwardly toward the axis of the harpoon shaft (see FIG. 8). The plate 221 with the harpoon 140 attached to it is then moved toward the right or forwardly as seen in FIGS. 8 and 9, and the clamp plate 222 is also moved toward the right. With reference to FIG. 10, the two harpoon blades 142 and 143 pass through the openings of the two plates 212 and 222 and through the tire 194. The forward portion 146 of each harpoon blade narrows to a point 196 and it has an outer surface 197 that slants rearwardly and radially outwardly to the barb 149. The engagement of the surfaces 197 of the two harpoon blades lifts the tire upwardly and centers it relative to the clamp ring 162 before the tire is clamped, as shown in FIG. 10. The forward portion 178 of the cutter mechanism 177 also serves to center the tire. The two harpoon blades are pivoted counterclockwise as shown in FIG. 10 by their engagement with the margins of the openings in the plates 222 and 212 and the beads of the tire. The rearward portion 147 of each blade is pivoted radially inwardly to the position shown in FIGS. 10–12 wherein its outer surface 198 is approximately at the same radial level as the barb 149. As the harpoon passes through the center of the tire and after the tire has been centered relative to the ring 161, the plate 222 is moved farther toward the right as shown in FIGS. 11 and 12 and the sidewalls of the tire are tightly clamped between the clamp ring 161 and the circular clamp plate 171 as shown in FIG. 12. The forward movement of the harpoon is then stopped after the barbs 149 have moved past the beads 195, and, with reference to FIG. 12, the harpoon shaft is moved toward the left or rearwardly. The beads 195 of the tire extend radially inwardly slightly from the inner edges of the clamp ring 161, and the barbs 149 of the two harpoon blades engage the beads of the tires just to the outside of the wires. As the harpoon is moved rearwardly, the barbs cut through the sidewalls and the bead wires are pulled downwardly into the bottoms of the two slots 148 of the blades and also into the opening 179 of the the bead cutter 177. The hydraulic mechanism 182 of the bead cutter is actuated to move the blade 181 forwardly slightly and lightly clamp the portions of the beads which are in the opening 179 in order to prevent the beads from moving out of the opening 179 during the stripping operation. Continued rearward movement of the harpoon causes the two beads to be pulled or stripped loose from the sidewalls of the tire and to be pulled rearwardly through the opening 160 of the plate 222. After the two beads are to the left of the plate 222, the bead cutter mechanism 182 is further operated to move the blade 181 a further distance to the right and completely sever the two bead wires, whereupon the two bead wires fall downwardly and off the harpoon. As the harpoon is moved rearwardly with the beads, the plate 222 is also moved rearwardly and the tire is unclamped, thereby allowing the tire 196 to fall downwardly onto the support 191. During the time that the tire is clamped as shown in FIGS. 11 and 12, the support 191 is folded down out of the way as shown in FIG. 12. The hydraulic mechanism 222 is then operated to enable the tire to roll out of the machine and another tire is then moved into the machine so that the operation is repeated. After the wire severing operation, the mechanism 182 is operated to retract the blade of the cutting mechanism.

What is claimed is:

1. Apparatus for operating on tires such as automotive tires, each of said tires having first and second annular side walls, bead wires and a center circular tire opening, said tire opening having a tire axis at substantially the center thereof and extending perpendicularly to said tire opening, said apparatus comprising first and second clamp means positioned adjacent one another and adapted to receive a tire therebetween, said clamp means having clamp openings therein which are substantially concentric with said tire opening of a tire between said clamp means, first power means for moving said first and second clamp means toward each other and thereby clamping the side walls of the tire therebetween, a harpoon movable on a line of movement which is generally parallel with said tire axis, second power means for moving said harpoon along said line of movement, movement of said harpoon in said forward direction causing said harpoon to move through said clamp openings and said tire opening, said harpoon having means thereon for engaging a tire between said first and second clamp means and moving the tire to substantially center said tire opening with said clamp openings during said movement of said harpoon, means for actuating said first power means to move said first and second clamp means to clamp said side walls after a said tire opening has been substantially centered, and said harpoon further having at least one barb formed thereon, and said barb engaging and pulling said bead wires from the carcass of the tire after said side walls are clamped by said clamp means.

2. Apparatus for operating on a tire, the tire having a carcass which includes opposite sides, two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including at least one barb thereon which is operable to cut through said beads, engage said bead wires and pull said bead wires loose from said carcass during movement in said rearward direction, said clamp means comprising first and second clamps mounted for relative movement between a tire clamping position wherein said clamps are relatively close together and are operable to clamp a tire carcass therebetween, and a retracted position wherein said clamps are separated and unclamp the tire, and second power means for moving said first and second clamps between said clamping and retracted positions, said first and second clamps being formed by first and second plates having openings therethrough, said openings of said plates being located to receive said harpoon.

3. Apparatus as set forth in claim 2, wherein at least one of said first and second clamps include annular means for engaging a side wall of a tire.

4. Apparatus as set forth in claim 3, wherein said annular means includes adjustment means for changing the diameter of said annular means.

5. Apparatus as set forth in claim 2, wherein at least one of said first and second clamps further includes a ring secured to said first plate, said ring having an outer periphery, and a plurality of gussets on said outer periphery of said ring for preventing the carcass from moving onto said outer periphery of said ring.

6. Apparatus for operating on a tire, the tire having a carcass which includes opposite, sides two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including at least one barb thereon which is operable to cut through said beads, engage said bead wires and pull said bead wires loose from said carcass during movement in said rearward direction, said harpoon comprising a harpoon shaft and a barb member pivotably mounted on said shaft, said barb member having an outer surface, a forward end and said barb formed thereon.

7. Apparatus as set forth in claim 6, wherein said barb member includes a portion which is forward of said barb and has an outer surface which slants rearwardly and radially outwardly from the forward end of said barb member to said barb.

8. Apparatus as set forth in claim 6, and further including bias means connected to said barb member for pivoting the forward end of said barb member radially inwardly toward said shaft.

9. Apparatus as set forth in claim 6, wherein said barb member has a slot formed therein which slants from the outer surface thereof forwardly and radially inwardly, said barb being formed where said slot meets said outer surface.

10. Apparatus as set forth in claim 6, wherein a plurality of barb members are pivotably mounted on said shaft.

11. Apparatus for operating on a tire, the tire having a carcass which includes opposite, sides two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including a plurality of barbs thereon which are operable to cut through said beads, engage said bead wires and pull said bead wires loose from said carcass during movement in said rearward direction, said harpoon including a harpoon shaft and at least two barb members mounted on said shaft, each of said barb members having radially outer edges and extending substantially radially outwardly from said shaft, and said barbs being formed on the radially outer edges of said barb members.

12. Apparatus as set forth in claim 11, wherein each of said barb members further includes slots which slant forwardly and radially inwardly from said barbs.

13. Apparatus for operating on a tire, the tire having a carcass which includes opposite sides, two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including at least one barb thereon which is operable to cut through said beads, engage said bead wires and pull said bead wires loose from said carcass during movement in said rearward direction, said harpoon further including a slanted surface adjacent the forward end thereof, said slanted surface extending upwardly and rearwardly from the forward portion of said harpoon and lifting a tire in said clamp means during said forward movement of said harpoon.

14. Apparatus for operating on a tire, the tire having a carcass which includes opposite sides, two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including at least one barb thereon which is operable to cut through said beads, engage said bead wires and pull said bead wires loose from said carcass during movement in said rearward direction, said clamp means comprising first and second clamps mounted for relative movement between a tire clamping position wherein said clamps are relatively close together and are operable to clamp a tire carcass therebetween, and a retracted position wherein said clamps are separated and unclamp the tire, second power means for moving said first and second clamps between said clamping and retracted positions, and further including a tire support extending between said first and second clamp means and below said clamps for supporting a tire between said clamps, said support being flexible and foldable when said clamps are moved to said tire clamping position.

15. Apparatus for operating on a tire, the tire having a carcass which includes opposite sides, two side walls, and annular beads forming a circular central opening, the opening having a centrally located axis and the beads having bead wires embedded therein, said apparatus comprising clamp means cooperating to engage opposite sides of the tire carcass and securely clamp the carcass but expose the beads and the central opening, said clamp means engaging said carcass at a plurality of angularly spaced locations and thereby holding said carcass substantially stationary, a harpoon mounted adjacent said clamp means for movement relative to said clamp means in forward and rearward directions through said central opening and generally parallel to the axis of said opening, first power means connected to said harpoon for moving said harpoon in said forward and rearward directions relative to said clamp means, said harpoon having a forward end and including at least one barb thereon which is operable to cut through said beads, engage said bead wires and pull said bead wires loose from said carcass during movement in said rearward direction, and further including cutter means on said harpoon adjacent said barb for cutting the bead wires after removal from a tire.

16. Apparatus for operating on tires such as automotive tires which have side walls, bead wires, an axis and a center opening, comprising first and second clamp means positioned adjacent one another and adapted to receive a tire therebetween, first power means for moving said first and second clamp means toward each other and thereby clamping the side walls of the tire therebetween, a harpoon movable on an axis of movement which is generally parallel with the axis of the tire, second power means for moving said harpoon in forward and rearward directions along said axis of movement, movement of said harpoon in said forward direction causing said harpoon to move through said clamp means and into the opening of a tire between said clamp means, and movement of said harpoon in said rearward direction causing said harpoon to move out of said opening of said tire, said harpoon having at least two barbs formed thereon, and said barbs engaging and pulling said bead wires from the carcass of the tire during said movement of said harpoon in said rearward direction.

17. Apparatus for operating on a tire having an annular carcass including opposite sides, beads, bead wires in said beads which form a central circular tire opening, said tire opening having a tire axis at the center of said opening and said axis being substantially perpendicular to said sides, said apparatus comprising clamp means adjacent said opposite sides and movable together to clamp said sides therebetween and prevent substantial movement of said carcass in the direction of said tire axis, said clamp means forming an unobstructed, generally circular clamp opening which is substantially concentric with said tire opening, a harpoon mounted adjacent said clamp means for movement relative to said clamp means through said tire opening and said clamp opening, said harpoon being located and moving adjacent said tire axis and including at least one barb means located to engage said bead wire during movement of said harpoon through said tire opening and said clamp opening.

18. Apparatus as set forth in claim 16, wherein said harpoon includes at least two of said barb means, and said barb means extend substantially radially of said tire axis.

19. Apparatus as set forth in claim 16, wherein said clamp means engages and clamps a plurality of angularly spaced portions of said carcass.

20. Apparatus as set forth in claim 16, and further including means for cutting a bead wire after removal from a carcass, said harpoon moving said bead wire into said cutting means.

* * * * *